(12) United States Patent
Wikramanayake et al.

(10) Patent No.: US 11,242,271 B2
(45) Date of Patent: Feb. 8, 2022

(54) REMOVING HEAVY METALS IN A BALLASTED PROCESS

(71) Applicant: Evoqua Water Technologies, LLC, Pittsburgh, PA (US)

(72) Inventors: Rohan Wikramanayake, Swampscott, MA (US); Raymond G. Pepin, Westbrook, ME (US); Thomas Miles, Hatfield, PA (US)

(73) Assignee: Evoqua Water Technologies LLC, Pittsburgh, PA (US)

(*) Notice: Subject to any disclaimer, the term of this patent is extended or adjusted under 35 U.S.C. 154(b) by 377 days.

(21) Appl. No.: 16/307,551

(22) PCT Filed: Jun. 5, 2017

(86) PCT No.: PCT/US2017/035875
§ 371 (c)(1),
(2) Date: Dec. 6, 2018

(87) PCT Pub. No.: WO2017/214003
PCT Pub. Date: Dec. 14, 2017

(65) Prior Publication Data
US 2019/0194048 A1 Jun. 27, 2019

Related U.S. Application Data

(60) Provisional application No. 62/346,017, filed on Jun. 6, 2016.

(51) Int. Cl.
*C02F 1/52* (2006.01)
*C02F 3/12* (2006.01)
(Continued)

(52) U.S. Cl.
CPC .......... *C02F 3/1226* (2013.01); *C02F 1/5209* (2013.01); *C02F 1/5236* (2013.01);
(Continued)

(58) Field of Classification Search
CPC ..................................................... C02F 3/1226
See application file for complete search history.

(56) References Cited

U.S. PATENT DOCUMENTS

| 7,323,108 B1 | 1/2008 | Garbett et al. |
| 7,416,668 B1 | 8/2008 | Theodore |

(Continued)

FOREIGN PATENT DOCUMENTS

| CA | 2749644 A1 | 8/2010 |
| CN | 1491190 A | 4/2004 |

(Continued)

OTHER PUBLICATIONS

Mulder, Loneke, "Extended European Search Report", European Patent Application No. 17810770.2, dated Feb. 3, 2020, 11 pages.
(Continued)

*Primary Examiner* — Peter Keyworth

(57) ABSTRACT

A system for treating metal-contaminated wastewater includes a primary treatment sub-system, a secondary treatment sub-system, and a tertiary treatment sub-system. The tertiary treatment sub-system includes a reactor tank, a source of ballast material, a source of coagulant, a solids-liquid separator, and a controller configured to recycle ballasted solids from the solids-liquid separator to the reactor tank an amount sufficient to generate metal hydroxide floc in the reactor tank to reduce a concentration of dissolved metal in the reactor tank.

15 Claims, 2 Drawing Sheets

(51) Int. Cl.
*C02F 1/56* (2006.01)
*C02F 1/66* (2006.01)
*C02F 3/00* (2006.01)
*C02F 101/20* (2006.01)

(52) U.S. Cl.
CPC .................................... *C02F 1/56* (2013.01);
*C02F 1/66* (2013.01); *C02F 2003/003*
(2013.01); *C02F 2101/20* (2013.01); *C02F*
*2209/06* (2013.01); *C02F 2305/12* (2013.01);
*Y02W 10/10* (2015.05)

(56) References Cited

U.S. PATENT DOCUMENTS

| | | | |
|---|---|---|---|
| 2004/0217062 A1* | 11/2004 | Yada | C02F 1/74 |
| | | | 210/721 |
| 2008/0135491 A1 | 6/2008 | Cort | |
| 2008/0203015 A1 | 8/2008 | Marston et al. | |
| 2008/0302723 A1 | 12/2008 | Daigger | |
| 2009/0308815 A1* | 12/2009 | Sauvignet | B01D 21/08 |
| | | | 210/709 |
| 2012/0211416 A1 | 8/2012 | Woodard et al. | |
| 2014/0102986 A1* | 4/2014 | Masciola | C02F 1/5236 |
| | | | 210/669 |
| 2015/0336826 A1* | 11/2015 | Peeters | C02F 3/104 |
| | | | 210/616 |

FOREIGN PATENT DOCUMENTS

| | | |
|---|---|---|
| CN | 1617837 A | 5/2005 |
| CN | 101568493 A | 10/2009 |
| CN | 101641297 A | 2/2010 |
| CN | 101903297 A | 12/2010 |
| CN | 102292297 A | 12/2011 |
| CN | 103435219 A | 12/2013 |
| CN | 104395246 A | 3/2015 |
| WO | 2008141290 A1 | 11/2008 |
| WO | 2013/187979 | 12/2013 |
| WO | 2015/200478 | 12/2015 |

OTHER PUBLICATIONS

Unknown, "First Office Action", Chinese Patent Application No. 201780035385.7, dated Jun. 16, 2021, 12 pages.

Mulder, Lonneke, "Communication pursuant to Article 94(3) EPC", European Patent Application No. 17810770.2, dated Jul. 7, 2021, 5 pages.

* cited by examiner

REMOVING HEAVY METALS IN A BALLASTED PROCESS

RELATED APPLICATIONS

This application claims priority under 35 U.S.C. § 119(e) to U.S. Provisional Application Ser. No. 62/346,017 titled "REMOVING HEAVY METALS IN A BALLASTED PROCESS," filed on Jun. 6, 2016, which is herein incorporated by reference in its entirety.

FIELD OF TECHNOLOGY

One or more aspects of the disclosure relate generally to water and wastewater treatment, and more particularly to systems and methods for removing dissolved metal contaminants from wastewater in a tertiary treatment system.

SUMMARY

In accordance with an aspect of the present disclosure, there is provided a system for treating wastewater. The system comprises a primary treatment sub-system and a secondary treatment sub-system in fluid communication downstream of the primary treatment sub-system. The secondary treatment sub-system is configured to remove biological contaminants from the wastewater and produce a partially treated wastewater including a dissolved metal. The system further includes a tertiary treatment sub-system in fluid communication downstream of the secondary treatment sub-system. The tertiary treatment sub-system comprises a reactor tank configured and arranged to receive the partially treated wastewater from the secondary treatment sub-system, the reactor tank including at least one inlet and an outlet, a source of a ballast material fluidly connected to the reactor tank, a source of coagulant fluidly connected to the reactor tank, a solids-liquid separator having an inlet fluidly connected to the outlet of the reactor tank and including a solids-lean effluent outlet and a ballasted solids outlet, the solids-liquid separator configured to separate ballasted effluent from the outlet of the reactor tank into a solids-lean effluent and ballasted solids, to discharge the solids-lean effluent from the solids-lean effluent outlet, and to discharge the ballasted solids from the ballasted solids outlet, a recycle conduit having an inlet fluidly connected to the ballasted solids outlet, and an outlet fluidly connected to the reactor tank, and a controller configured to recycle a portion of the ballasted solids from the ballasted solids outlet of the solids-liquid separator to the reactor tank through the recycle conduit in an amount sufficient to generate an amount of metal hydroxide floc in the reactor tank sufficient to reduce a concentration of dissolved metal in the reactor tank.

In some embodiments, the controller is configured to recycle the portion of the ballasted solids from the ballasted solids outlet of the solids-liquid separator to the reactor tank through the recycle conduit in an amount sufficient to generate an amount of metal hydroxide floc in the reactor tank sufficient to reduce a concentration of dissolved metal in the reactor tank to below about 10 micrograms/liter or to below about 5 micrograms/liter.

In some embodiments, the controller is configured to recycle between about 5% and about 25% of ballasted solids separated from the ballasted effluent in the solids-liquid separator to the reactor tank. The controller may be configured to recycle about 10% of ballasted solids separated from the ballasted effluent in the solids-liquid separator to the reactor tank.

In some embodiments, the system further comprises a source of a metal precipitant in fluid communication with the reactor tank. The metal precipitant may be a sulfide-containing compound.

In some embodiments, the system further comprises a source of a pH adjustment agent in fluid communication with the reactor tank. The controller may be further configured to control a quantity of pH adjustment agent introduced into the reactor tank to achieve a pH in the reactor tank at which a compound including the dissolved metal is substantially insoluble.

In some embodiments, the system further comprises a source of a flocculant in fluid communication with the reactor tank and/or a source of an adsorbant in fluid communication with the reactor tank and/or a source of a pH adjustment agent in fluid communication with the reactor tank.

In some embodiments, the system further comprises a ballast recovery system in fluid communication with the ballasted solids outlet of the solids-liquid separator, the ballast recovery system configured to separate ballast from the ballasted solids and return the separated ballast to one of the reactor tank and the source of ballast material.

In some embodiments, the secondary treatment system comprises a second reactor tank configured and arranged to remove biological contaminants from the wastewater, and a ballast recycle system configured to return a portion of ballasted solids output from the second reactor tank to the second reactor tank.

In accordance with another aspect, there is provided a method for treating wastewater. The method comprises treating the wastewater in primary treatment sub-system and a secondary treatment sub-system to produce a partially treated wastewater having a reduced concentration of organic contaminants as compared to the wastewater and including a dissolved metal, introducing the partially treated wastewater into a reactor tank with a ballast material and a coagulant to form ballasted solids, introducing a ballasted effluent from the reactor tank including the ballasted solids into a solids-liquid separator, separating the ballasted effluent into ballasted solids and a solids-lean effluent in the solids-liquid separator, and recycling a portion of the ballasted solids from the solids-liquid separator to the reactor tank in an amount sufficient to generate an amount of metal hydroxide floc in the reactor tank sufficient to reduce a concentration of dissolved metal in the reactor tank.

In some embodiments, recycling the portion of the ballasted solids from the solids-liquid separator to the reactor tank comprises recycling the portion of the ballasted solids from the solids-liquid separator to the reactor tank in an amount sufficient to generate an amount of metal hydroxide floc in the reactor tank sufficient to reduce a concentration of dissolved metal in the reactor tank to below about 10 micrograms/liter or to below about 5 micrograms/liter.

In some embodiments, the method further comprises introducing a flocculant into the reactor tank with the partially treated wastewater, ballast, and coagulent. The method may further comprise introducing an adsorbant into the reactor tank with the partially treated wastewater, ballast, flocculant, and coagulent.

In some embodiments, the method further comprises introducing an adsorbant into the reactor tank with the partially treated wastewater, ballast, and coagulent.

In some embodiments, the method further comprises introducing a metal precipitant into the reactor tank with the partially treated wastewater, ballast, and coagulent.

In some embodiments, the method further comprises adjusting a pH of the partially treated wastewater in the reactor tank to a pH at which a compound of the dissolved metal is substantially insoluble.

In accordance with another aspect, there is provided a method of retrofitting a wastewater treatment system to facilitate increased removal of dissolved metals from wastewater. The method comprises fluidly connecting a tertiary treatment sub-system to an outlet of a secondary treatment sub-system of the wastewater treatment system. The tertiary treatment sub-system includes a reactor tank configured and arranged to receive the partially treated wastewater from the secondary treatment sub-system, the reactor tank including at least one inlet and an outlet, a source of a ballast material fluidly connected to the reactor tank, a source of coagulant fluidly connected to the reactor tank, a solids-liquid separator having an inlet fluidly connected to the outlet of the reactor tank and including a solids-lean effluent outlet and a ballasted solids outlet, the solids-liquid separator configured to separate ballasted effluent from the outlet of the reactor tank into a solids-lean effluent and ballasted solids, to discharge the solids-lean effluent from the solids-lean effluent outlet, and to discharge the ballasted solids from the ballasted solids outlet, a recycle conduit having an inlet fluidly connected to the ballasted solids outlet, and an outlet fluidly connected to the reactor tank, and a controller configured to recycle a portion of the ballasted solids from the ballasted solids outlet of the solids-liquid separator to the reactor tank through the recycle conduit in an amount sufficient to generate an amount of metal hydroxide floc in the reactor tank sufficient to reduce a concentration of dissolved metal in the reactor tank.

In some embodiments, the method further comprises providing instructions to configure the controller to recycle a portion of the ballasted solids from the ballasted solids outlet of the solids-liquid separator to the reactor tank through the recycle conduit in an amount sufficient to generate an amount of metal hydroxide floc in the reactor tank sufficient to reduce a concentration of dissolved metal in the reactor tank to below about 5 micrograms/liter.

In some embodiments, the method further comprises fluidly connecting a source of metal precipitant to the reactor tank and/or fluidly connecting a source of pH adjustment agent to the reactor tank.

In some embodiments, the method further comprises providing instructions to program the controller to control a quantity of pH adjustment agent introduced into the reactor tank to achieve a pH in the reactor tank at which a compound including an undesirable metal in the partially treated wastewater is substantially insoluble.

In some embodiments, the method further comprises fluidly connecting a source of flocculant to the reactor tank and/or fluidly connecting a source of adsorbant to the reactor tank.

DESCRIPTION OF THE DRAWINGS

The accompanying drawings are not intended to be drawn to scale. For purposes of clarity, not every component may be labeled in the drawings, nor is every component of each embodiment of the disclosure shown where illustration is not necessary to allow those of ordinary skill in the art to understand the disclosure.

In the drawings.

DETAILED DESCRIPTION

Figure 1:
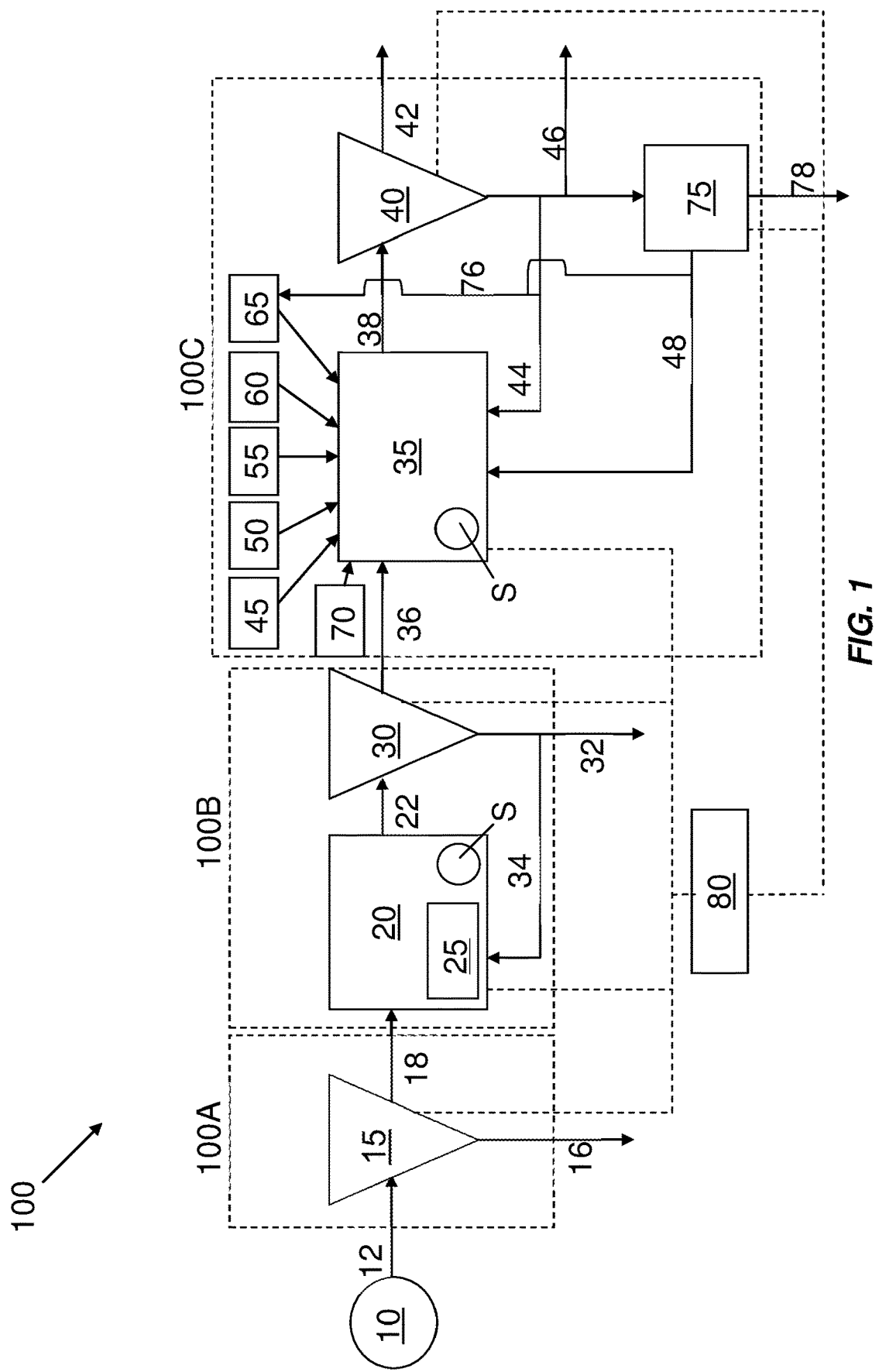
FIG. 1 presents a schematic of a wastewater treatment system.

This disclosure is directed to systems and methods of treating water or wastewater to, for example, reduce the concentration of metals in the water or wastewater, and render the water suitable for secondary uses or discharge to the environment. One or more aspects relate to wastewater treatment systems and methods of operation and facilitating operation of same. The disclosure is not limited to the details of construction and the arrangement of components, systems, or sub-systems set forth herein and is capable of being practiced or of being carried out in various ways.

One or more aspects relate to wastewater treatment systems for treating wastewater having an undesirably high contaminant level. For example, the wastewater treatment systems may be used for treating wastewater having a high concentration of one or more heavy metals. Elevated heavy metal levels, as the term is used herein, may refer to dissolved heavy metal concentrations that may be higher than about 10 μg/l, or greater. Much of the heavy metals in wastewater may go untreated in conventional wastewater treatment systems and may be discharged, resulting in potential contamination of rivers, bays, and estuaries, and other waterways or water sources. Heavy metals are generally toxic to life forms, particularly aquatic life. Discharged untreated wastewater may exceed discharge limits for various contaminants, for example, particular heavy metals, such as zinc or copper. The removal of heavy metals from wastewater has become very important with new stringent regulations that demand that levels in some jurisdictions be as low as 5 μg/l or less. Typical methods to remove metals have used precipitation by way of a metal hydroxide floc often with the use of precipitating agents, for example, sodium sulfide and pH adjustment agents. These precipitating agents and pH adjustment agents may themselves be undesirable contaminants and may be expensive to use. Accordingly, a desire exists to operate a wastewater treatment plant to remove dissolved metals without the use of a significant amount of chemical agents.

Contaminants that may be discharged with untreated wastewater may include at least one of total suspended solids (TSS), biologically active organic matter, microorganisms, for example, pathogens or non-pathogens, nitrogen, phosphorous, and/or heavy metals. Heavy metals are generally defined as metals with relatively high densities, atomic weights, or atomic numbers. Heavy metals tend to be less reactive than lighter metals and have much less soluble sulfides and hydroxides. Heavy metals can be toxic in large amounts or in certain forms. In efforts to reduce the effects of heavy metals, many secondary use and point source dischargers have received more stringent effluent limits for heavy metals. Conventional processes precipitate heavy metals from the wastewater. The heavy metals may be precipitated as a hydroxide or as a sulfide. Precipitation of heavy metals cannot reduce the heavy metal concentration to at or below the lowest acceptable discharge levels. Heavy metal removal systems may remove heavy metals from wastewater through the use of ballast materials.

One or more aspects of the present disclosure involve embodiments directed to the removal of or for the reduction of the level of one or more contaminants from wastewater. One or more aspects of the disclosure relate to wastewater treatment systems and methods of operation and methods of modification thereof.

Typically, water to be treated, such as wastewater or a wastewater stream, contains waste matter that, in some instances, can comprise solids, soluble and insoluble organic and inorganic material, and heavy metals. Prior to discharge to the environment, such streams may be treated to decontaminate or at least partially render the wastewater streams benign or at least satisfactory for discharge under established regulatory requirements or guidelines. For example, the water can be treated to reduce its heavy metal content to within acceptable limits.

Systems and methods are provided for treating water or wastewater. In accordance with one or more embodiments, the disclosure relates to one or more systems and methods for treating wastewater, wherein the heavy metal content of the wastewater to be treated exceeds a target value. In accordance with one or more embodiments, a recycle system is provided to recycle ballasted solids from treated effluent from a ballast reactor tank to the wastewater treatment system. For example, a recycle system may be provided to recycle ballasted solids from the treated effluent to the ballast reactor tank, source of ballast for the ballast reactor tank, or a system upstream of the ballast reactor tank. The ballasted solids may be separated from a solids-lean portion of the treated effluent prior to recycle in a solids-liquid separation system, for example, a clarifier.

In accordance with one or more embodiments, the disclosure relates to one or more systems and methods for treating wastewater. The system may receive wastewater from a municipal or industrial source. For example, the wastewater may be delivered from a municipal or other large-scale sewage system.

In accordance with one or more embodiments, the disclosure relates to one or more systems and methods for retrofitting a wastewater treatment system. Methods are provided for facilitating the treatment of wastewater in a wastewater treatment system. In an embodiment, a method comprises providing a recycle line between the treated effluent from a ballast reactor tank and the ballast reactor tank or source of ballast material.

In some embodiments, a method of facilitating the treatment of wastewater is provided. The wastewater treatment system may comprise a conduit connected to an outlet of a clarifier. The method may comprise providing a recycle line fluidly connectable to treated effluent downstream of the ballast system of the wastewater treatment system, the recycle line being configured to direct a portion of the ballasted solids from the treated effluent to the ballast system. The ballast system may comprise a solids-liquid separator, for example, a clarifier configured to separate ballasted solids from effluent from the ballast system, and a recycle conduit to direct the separated ballasted solids to a source of ballast material fluidly connected to an inlet of the ballast reactor tank.

In some embodiments, operation of the wastewater treatment system may comprise introducing wastewater from a source of wastewater to a biological reactor. As used herein, the term "biological reactor" is a reactor having a population of microorganisms, which may include diverse types of bacteria, used to decompose biodegradable material. The conversion of pollutants or contaminants to innocuous compounds is typically facilitated or mediated by the microorganisms as the wastewater is passed through the wastewater treatment system. A biomass of microorganisms typically requires an environment that provides the proper conditions for growth or biological activity. A biological reactor may comprise a plurality of compartments or regions that may be partitioned or not. For example, a biological reactor may comprise aerobic, anaerobic, and/or anoxic compartments or regions. Compartments of a biological reactor may comprise nitrification or denitrification compartments or regions. The size of the biological reactor may depend on the size of the wastewater treatment plant. For example, the size of the biological reactor may range from about 0.5 million gallons to about 100 million gallons. The biological reactor may comprise one or more reactor vessels or tanks that are positioned in series or in parallel. Partially treated wastewater exiting the biological treatment system may contain particulate or dissolved metals above a desired level for discharge, for example, from about 10 µg/l to about 100 µg/l, depending on the source of the wastewater and type of biological treatment used.

A ballasted wastewater treatment system may comprise a ballast reactor tank configured to provide a ballasted effluent and a source of ballast material fluidly connected to the ballast reactor tank. In some embodiments, the ballast system may comprise a source of coagulant fluidly connected to the ballast reactor tank. In some embodiments, the ballasted system may comprise a source of flocculant fluidly connected to the ballast reactor tank. In some embodiments, the ballasted system may comprise a source of adsorbant fluidly connected to the ballast reactor tank. The ballasted system may comprise a source of a chemical (referred to herein as a metal precipitant) fluidly connected to the ballast reactor tank that facilitates precipitation of dissolved metals or compounds thereof, for example, metal hydroxides, from liquid in the ballast reactor tank. The addition of ballast, and optionally additional components such as flocculant, coagulant, adsorbant, and/or metal precipitant improves the removal of dissolved, colloidal, particulate, and microbiological solids. The precipitation and enhanced settlability of ballasted solids provides for a more efficient, for example, smaller and/or faster, clarification step as compared to conventional clarification systems, which may allow for a small footprint system comprising biological treatment, ballast treatment, and clarification steps.

Flocculation may be a process of contact and adhesion whereby particles and colloids in liquid such as wastewater form larger-size clusters of material. Particles may cluster together in a floc. A flocculant may comprise a material or a chemical that promotes flocculation by causing colloids and particles or other suspended particles in liquids to aggregate, forming a floc. Polymers may be used as flocculants. For example, acrylic acid/acrylamide copolymers and modified polyacrylamides may be used.

Coagulation may be a process of consolidating particles, such as colloidal solids. Coagulants may include cations. They may include cations such as aluminum, iron, calcium, or magnesium (positively charged molecules) that may interact with negatively charged particles and molecules and reduce the barriers to aggregation. Examples of coagulants include bentonite clay, polyaluminum chloride, polyaluminum hydroxychloride, aluminum chloride, aluminum chlorohydrate, aluminum sulfate, ferric chloride, ferric sulfate, and ferrous sulfate monohydrate.

Adsorption may be a physical and chemical process of accumulating a substance at the interface between liquid and solids phases. The adsorbant may be powdered activated carbon (PAC). PAC is an effective adsorbent because it is a highly porous material and provides a large surface area to which contaminants may adsorb. PAC may have a diameter of less than about 0.1 mm and an apparent density ranging between about 20 lb/ft³ and about 50 lb/ft³. PAC may have a minimum iodine number of 500 as specified by AWWA standards.

According to some embodiments of the disclosure, a biological reactor may be used in conjunction with a ballasted treatment system to treat water or wastewater. The systems and methods of the present disclosure may be particularly advantageous, for example, in treatment plants where a small footprint is desired such as, for example, a retrofit for industrial plants, small flow plants or package plants, hybrid wastewater plants, combining fixed film processes and activated sludge processes, and lagoon plants requiring nitrification. The use of a biological reactor process in combination with ballasted settling is not limited to the examples given. Many uses in biological and chemical treatment of wastewater or potable water are possible.

In certain embodiments, a biological reactor process followed by a ballasted flocculation process may be utilized for biological treatment of water or wastewater to remove at least one of nitrogen compounds, such as nitrates, biologically active organic matter, chemically active organic matter, phosphorous compounds, and/or heavy metals. Biological solids produced may then be removed in addition to dissolved, colloidal, and particulate solids by clarifiers. In certain embodiments, heavy metals may be removed from the wastewater undergoing treatment to provide treated wastewater prior to discharge to the environment or prior to disinfection to provide potable water or drinking water to distribute to a water supply grid.

Ballasted flocculation systems may comprise the addition of a ballast, and optionally, a coagulant and/or flocculant to improve the removal of dissolved, colloidal, particulate, and microbiological solids. In certain embodiments, the ballast may be a magnetic ballast.

In some embodiments, recirculation of ballasted solids to at least one of the biological treatment process, ballasted flocculation processes, or to the source of ballast can further enhance the reliability of the overall system. These features may be utilized in existing wastewater treatment plants, small flow plants or package plants, combined sewer overflow (CSO) treatment plants, new plants that require a small footprint, and hybrid treatment plants (fixed film and activated sludge). One benefit is that an existing clarifier downstream of a biological reactor process may be readily convertible to a ballasted system having ballasted solids recycle using the system of the present disclosure.

In some embodiments of the disclosure, a system for treating wastewater is provided. The system comprises a biological reactor fluidly connected to a source of wastewater and configured to provide a biological reactor effluent. The biological reactor effluent may flow to a ballasted flocculation system in which a source of coagulant may be fluidly connected to the biological effluent and configured to provide a coagulated effluent. A source of ballast may be fluidly connected to the coagulated effluent and configured to provide a ballasted effluent. In some embodiments, the source of ballast may be fluidly connected to at least one of the biological effluent or the coagulated effluent.

The source of ballast may comprise a powdered ballast. The ballast may be added to a ballasted reactor tank in dry powdered form. In some embodiments, the ballast may be added by an operator or by machinery, such as by a dry feeder. A clarifier may be fluidly connected to the ballasted effluent outlet of a ballasted reactor tank. The clarifier may comprise a treated effluent outlet and a ballasted solids outlet and may be configured to separate ballasted effluent from the ballasted reactor tank into a substantially ballast-free treated effluent and ballasted solids. The ballasted solids outlet of the clarifier may be fluidly connected to the biological reactor, ballast reactor tank, or a source of ballast for the ballast reactor tank.

A source of flocculant may be fluidly connected to the ballast reactor tank. At least one of the sources of coagulant, ballast, flocculant, and adsorbant may be provided in line to a biological reactor effluent stream. Alternately, tanks may be used such that the biological reactor effluent flows to a coagulant tank, into which a coagulant is added from a source of coagulant. The coagulated effluent may then flow to a ballast reactor tank, into which ballast is added from a source of ballast. The ballasted effluent may then flow to a flocculant tank, into which a flocculant is added from a source of flocculant. The flocculant effluent may then flow to the clarifier. In certain embodiments, a flocculant tank and source of flocculant may not be included in the ballasted flocculation system, and the ballasted effluent may flow directly to the clarifier. In some embodiments, a coagulant tank and source of coagulant may not be included in the ballasted flocculation system.

As discussed above, the ballast may be a magnetic ballast. The magnetic ballast may comprise an inert material. The magnetic ballast may comprise a ferromagnetic material. The magnetic ballast may comprise iron-containing material. In certain embodiments, the magnetic ballast may comprise an iron oxide material. For example, the magnetic ballast may comprise magnetite ($Fe_3O_4$). The magnetic ballast may have a particle size that allows it to bind with biological and chemical flocs to provide enhanced settling or clarification, and allow it to be attracted to a magnet so that it may be separated from the biological flocs. The particle size, e.g., the average diameter of the ballast, for example, the magnetic ballast, may be less than about 100 μm. In some embodiments, the particle size of the ballast, for example, the magnetic ballast, may be less than about 40 μm. In an embodiment, the particle size of the ballast, for example, the magnetic ballast may be less than about 20 μm. The particle size of the ballast may be between about 80 to about 100 μm, about 60 μm to about 80 μm, about 40 μm to about 60 μm, about 20 μm to about 40 μm, or about 1 μm to about 20 μm.

Sand ballasted systems often implement larger ballast sizes to effectively recover the ballast. Sand ballast is non-magnetic. Sand ballasted systems have implemented the use of cleaning agents to separate the biological solids from the sand particles. This could be a result of a large surface for bacteria to attach, requiring more than shearing forces of a vortex mechanism alone to remove biological solids from the sand particle surface, or the need to dissolve chemical bonds that assist in the binding of the ballast.

Unlike sand-based ballast that requires growth of floc around relatively large size sand particles, magnetite ballast can be used with small size, such as less than about 100 μm, allowing for the magnetite particles to impregnate existing floc. The ballasted effluent or the flocculant effluent may be directed to at least one clarifier where ballasted solids, such as magnetite ballasted solids, may be removed by gravity at an enhanced rate greater than that of conventional gravity clarifiers. The clarifier, being configured to provide a treated effluent and a ballasted solids portion, may be fluidly connected to at least one of the source of ballast, the ballasted reactor tank, the coagulated effluent, and the biological reactor. This may allow at least a portion of the ballasted solids to return to the ballast reactor tank and/or to the source of ballast, for example, a ballast tank connected to a source of ballast. All or a portion of the biological solids may also be removed from the system. This may involve utilizing a ballasted recovery system or wasting the biological solids prior to a ballasted recovery system. In some embodiments, the ballasted recycle system may comprise a magnetic separation apparatus, which may allow recycle of magnetic particles, which would not be feasible with, for example, sand particles. In certain embodiments, mechanical shearing may be employed to shear the biological solids prior to ballast recycle, for example, prior to magnetite recycle. In some instances, such as re-seeding and high flow events, a portion of solids settled in a clarifier may be recycled to the front of the ballast reactor tank. These solids may either be ballasted or solids stripped of magnetite through the magnetic separation.

In certain embodiments, a ballast recycle system may be positioned downstream of the ballasted solids outlet of the clarifier. The ballast recycle system may be connected to the ballasted solids outlet of the clarifier and at least one of the source of ballast and the ballast reactor tank.

In certain embodiments, the use of a magnetic ballast provides advantages over use of other ballast materials. For example, a magnetic drum may be used to separate the biological solids from the magnetic ballast in an efficient manner. Optionally, mechanical shearing may be utilized prior to separation. This process may sufficiently remove the biological solids from the ballast. Recycle of settled solids to the ballast reactor tank further enhances performance and reliability, and allows for additional flexibility for treatability and recovery in process upsets or startups. In certain embodiments, cleaning solutions are unnecessary in separating ballast from the heavy metals.

The present disclosure further comprises a recycle line. The recycle line may be connected to the ballasted solids outlet of the clarifier and at least one of the source of ballast and the ballast reactor tank. The recycle line may be configured to recycle the ballasted solids from the ballast effluent to at least one of the source of ballast and the ballast reactor tank.

In some embodiments, process control systems may be used. Typically, the control systems may be electrically connected to and may instruct valves along the recycle line to open and close. The control system may provide for adjustment of valves to adjust flow rates through one or more of the valves. The control system may instruct valves along the recycle line to open and close based on the use of a sensor configured to measure a property. The property may be a property of the system. For example, the property may be a concentration of one or more contaminants. The contaminant may be, for example, a heavy metal. The control system may strategically adjust the degree of opening of one or more valves in the recycle line. For example, a valve in the recycle line may be at least partially opened to allow for a portion of ballasted solids to be introduced to the source of ballast. In addition, a valve in the recycle line may be at least partially opened to allow for a portion of the ballasted solids to be introduced to the ballast reactor tank. The degree of opening of the valves in the recycle line can influence the portions of ballasted effluent or ballasted solids introduced to the source of ballast or the ballast reactor tank. Strategic management of the degree of opening of the valves may lead to overall improved removal of contaminants from the wastewater.

The control system may comprise one or more sensors. Non-limiting examples of sensors suitable for use in the methods and systems described herein may include any sensor capable of detecting a property of the wastewater at any point within the treatment system. The sensor may be positioned, for example, so as to determine the heavy metal concentration of the ballasted effluent. In certain embodiments, the sensors may detect or measure a process parameter and report the value to the control system. The control system may be configured to compare the detected or measured value with a target value. Responsive to a result of the comparison, the control system may be configured to select a degree of opening of valves in one or more conduits in the system.

In certain embodiments, the system may further comprise a measurement system. The measurement system may be in communication with the control system. In some embodiments, the measurement system may function as one or more components of a control system. The measurement system may be in communication with one or more sensors in the treatment system, as previously discussed. In various embodiments, the measurement system may be configured to measure one or more process parameters. For example, the measurement system may be configured to measure a level of heavy metals in the ballasted effluent. The measurement system may comprise one or more sensors. A portion of the ballasted effluent may be recycled to a at least one of the source of ballast and the ballast reactor tank based at least in part on the property measurement.

In certain embodiments, a wastewater treatment system may be in place, and being operated conventionally. The wastewater treatment system may encounter periods in which the system cannot adequately treat a wastewater stream, for example, when the heavy metal concentration of the wastewater is high. It may be beneficial to retrofit the wastewater treatment system with one or more systems of the present disclosure. For example, a recycle line may be put in place on an existing system so that the recycle line may recycle some of the ballasted effluent or ballasted solids to at least one of the source of ballast and the ballast reactor tank.

A system for treating wastewater is shown in FIG. 1, indicated generally at 100. In accordance with any of the aforementioned aspects of the disclosure, treatment system 100 may comprise one or more treatment operation units, which may include one or more biological reaction processes and one or more solids-reducing and solids-recycling systems or processes. The wastewater treatment system 100 may include a primary treatment portion or sub-system 100A, a secondary treatment portion or sub-system 100B, and a tertiary treatment portion or sub-system 100C.

The primary treatment sub-system 100A of the wastewater treatment system 100 is fluidly connected or connectable to a source of wastewater 10 via a conduit 12 and associated pumps and valves (not shown). The source of wastewater 10 may be a municipal, industrial, or residential source. The wastewater may be moved through the system by way of a pump upstream or downstream of the system. The source of wastewater may contain waste matter that, in some instances, can comprise solids, one or more dissolved heavy metals, and soluble and insoluble organic and inorganic material.

The primary treatment sub-system 100A includes a primary clarifier 15 and/or a filter, for example, a sand bed filter, that removes larger solids, sand, and grit from wastewater from the source of wastewater 10. Waste solids separated from the wastewater in the primary treatment sub-system 100A may be removed from the system via conduit 16 and sent for disposal or further treatment.

After primary treatment, the wastewater is sent to the secondary treatment sub-system 100B. The secondary treatment sub-system 100B may include one or more biological treatment units 20. Biological treatment unit 20 can be a reactor having an activated sludge to mix with the influent wastewater to form mixed liquor. The activated sludge can be a biological floc comprising a population of microorganisms capable of decomposing biodegradable material. For example, the activated sludge may comprise bacteria. Depending on the desired effluent, biological treatment unit or units 20 may be any one or more of aerated anoxic, aerobic, and anaerobic treatment units. In an embodiment, a biological treatment unit 20 may include an aerated anoxic zone including an aerator 25 providing dissolved oxygen sufficient to maintain anoxic conditions and contributing to the movement of the contents of the biological treatment unit 20 if desired. Optional aerator 25 is shown in FIG. 1, and may be connected to a source of gas. The source of gas may be air, oxygen, or other gases typically used in biological treatment processes.

The biological treatment unit(s) 20 may include a sensor S, or a plurality of such sensors, which are configured to measure a quality of a mixed liquor contained in the biological treatment unit(s) 20. Sensor S may measure, for example, the flow rate, volume, total suspended solids, total BOD, or species, for example, microorganism concentration in the mixed liquor. Sensor S may measure the concentration of nitrate and/or ammonia in the mixed liquor. Sensor S is illustrated in FIG. 1 as being disposed within biological treatment unit(s) 20, however, in other embodiments, any sensor S (or an additional sensor) can be provided on biological treatment unit influent conduit 18 or on biological treatment unit effluent conduit 22, for example. In some embodiments, it is desirable to position sensor S at a location in biological treatment unit(s) 20 where there is significant mixing of the contents of biological treatment unit(s) 20 to provide a representative measurement of the conditions within biological treatment unit(s) 20 as a whole. Sensor S may be placed at any position upstream or downstream of a unit operation, or within a unit operation.

The one or more biological treatment units 20 may have a mixed liquor outlet in fluid communication with a downstream solids-liquid separator, for example, clarifier 30, via conduit 22. The clarifier 30 may separate mixed liquor output from the one or more biological treatment units 20 into a solids lean effluent and a solids rich activated sludge. The solids lean effluent may include less than about 30 mg/L of TSS and/or less than about 30 mg/L of BOD and may include concentrations of one or more metals at levels above acceptable levels for discharge to the environment, for example, more than about 10 μg/L or more than about 5 μg/L. In one embodiment, the TSS concentration may be less than 10 mg/L. In one embodiment, the BOD concentration may be less than 10 mg/L. In one example, the total nitrogen concentration of the solids lean effluent may be less than 3 mg/L. In another example, the total phosphorous concentration of the solids lean effluent may be less than 1 mg/L.

A portion of the activated sludge may be recycled from a sludge outlet of the clarifier 30 back to one or more of the biological treatment units 20 via conduit 34 as return activated sludge. A second portion of the activated sludge output from the sludge outlet of the clarifier 30 may be removed from the system via conduit 32 and sent for disposal or further treatment.

The solids lean effluent of the clarifier may be considered partially treated wastewater. The partially treated wastewater may be directed to a tertiary treatment sub-system 100C for further treatment, for example, for removal of residual metals from the partially treated wastewater. The partially treated wastewater may be directed through a conduit 36 into a ballast reactor tank 35. In the ballast reactor tank 35, ballast from a source of ballast 65 may be added to the partially treated wastewater to facilitate settling of residual contaminants from the partially treated wastewater. In some embodiments, the ballast material can be a magnetic ballast. The magnetic ballast may comprise an inert material. The magnetic ballast may comprise a ferromagnetic material. The magnetic ballast may comprise iron-containing material. In certain embodiments, the magnetic ballast may comprise an iron oxide material. For example, the magnetic ballast may comprise magnetite ($Fe_3O_4$). The magnetic ballast may have a particle size that allows it to bind with chemical flocs to provide enhanced settling or clarification and allow it to be attracted to a magnet so that it may be separated from the chemical flocs. The particle size, for example, diameter of the magnetic ballast may be less than 100 μm. In some embodiments, the particle size of the magnetic ballast may be less than about 40 μm. In an embodiment, the particle size of the magnetic ballast may be less than about 20 μm. For example, the particle size may be between about 80 μm to about 100 μm, about 60 μm to about 80 μm, about 40 μm to about 60 μm, about 20 μm to about 40 μm, or about 1 μm to about 20 μm. The particle size referred to herein may be an average particle size. In some embodiments, the ballast material can consist of magnetite or consist essentially of magnetite. The ballast can be added in dry powdered form. In some embodiments, the ballast material may be added by an operator or by machinery. For example, ballast material may be added by a dry feeder.

In some embodiments, ballast reactor tank 35 is fluidly connected to a source of flocculant 45. The flocculant may comprise a material or a chemical that promotes flocculation by causing colloids and particles or other suspended particles in liquids to aggregate, forming a floc. The flocculant may be a polymer. For example, the flocculant may be acrylic acid/acrylamide copolymers or modified polyacrylamides.

In some embodiments, ballast reactor tank 35 is fluidly connected to a source of coagulant 50. The coagulant may comprise cations that interact with negatively charged particles and molecules that reduce the barriers to aggregation. For example, the coagulant may comprise aluminum, iron, calcium, or magnesium. The coagulant 16 may further comprise bentonite clay, polyaluminum chloride, polyaluminum hydroxychloride, aluminum chloride, aluminum chlorohydrate, aluminum sulfate, ferric chloride, ferric sulfate, and ferrous sulfate monohydrate.

In some embodiments, ballast reactor tank 35 is fluidly connected to a source of adsorbant 55. The adsorbant may comprise an activated carbon. For example, the adsorbant may comprise powdered activated carbon. Adsorption may be described as a physical and chemical process of accumulating a substance at the interface between liquid and solids phases. According to some embodiments, the adsorbent may be a powdered activated carbon (PAC). PAC is an effective adsorbent because it is a highly porous material and provides a large surface area to which contaminants may adsorb. PAC may have a diameter of less than 0.1 mm and an apparent density ranging between 20 and about 50 lbs/ft$^3$. PAC may have a minimum iodine number of 500 as specified by AWWA (American Water Works Association) standards.

In some embodiments, ballast reactor tank 35 is fluidly connected to a source of a pH adjuster 60. The source of pH adjuster 60 may include one or more of an acid, for example sulfuric acid, a base, for example, sodium hydroxide, or a buffering agent, for example, bicarbonate. The source of pH adjuster 60 may be used to adjust the pH of partially treated wastewater in the ballast reactor tank 35 to a pH at which one or more undesirable contaminants or compounds thereof, for example, one or more metal contaminants are substantially insoluble.

In some embodiments, ballast reactor tank 35 is fluidly connected to a source of a metal precipitant 70. The metal precipitant may be a chemical that causes dissolved metals or compounds thereof to precipitate from solution in the ballast reactor tank 35. The metal precipitant may comprise or consist of, for example, sodium sulfate ($Na_2S$).

The ballast reactor tank 35 may include a sensor S, or a plurality of such sensors, which are configured to measure a quality of partially treated wastewater contained in the ballast reactor tank 35. Sensor S may measure, for example, the flow rate, volume, total suspended solids, pH, dissolved metal concentration, or concentration of flocculant, coagulant, or metal precipitant in the partially treated wastewater contained in the ballast reactor tank 35. Sensor S is illustrated in FIG. 1 as being disposed within ballast reactor tank 35, however, in other embodiments, any sensor S (or an additional sensor) can be provided on the ballast reactor tank 35 influent conduit 36 or on contained in the ballast reactor tank 35 effluent conduit 38, for example. In some embodiments, it is desirable to position sensor S at a location in contained in the ballast reactor tank 35 where there is significant mixing of the contents contained in the ballast reactor tank 35 to provide a representative measurement of the conditions within the ballast reactor tank 35 as a whole.

Ballasted effluent from the ballast reactor tank 35 can be directed from ballast reactor tank 35 to a solids-liquid separation unit, for example, clarifier 40. Clarifier 40 is configured to separate the ballasted effluent into a treated wastewater portion and a ballasted solids portion. The ballasted solids portion may include precipitated metal hydroxide. Treated wastewater from the clarifier 40 may be delivered through outlet conduit 42 for discharge to the environment or for use as potable water or drinking water after further disinfection if necessary. The treated wastewater may be delivered to, for example, surface waters or a processing plant. The treated wastewater may have a dissolved metal concentration of less than about 10 µg/L of one or more heavy metals. In one embodiment, the treated wastewater may include less than about 5 µg/L of one or more heavy metals.

The ballasted solids portion of the ballasted effluent from the ballast reactor tank 35 may further be separated into a waste ballasted solids portion that may be output from the system via waste solids conduit 46 for disposal or further treatment, and a recycled ballasted solids portion. The recycled ballasted solids portion may be returned to the ballast reactor tank 35 via conduit 44 and/or to source of ballast 65 via conduit 76. The recycled ballasted solids portion can further be separated into discarded ballasted solids portion and a ballasted solids recovery portion by ballast material recovery system 75. The discarded ballasted solids portion may be output from the system via waste solids conduit 46 for disposal or further treatment. Ballast material recovery system 75 may comprise a magnetic separation apparatus. In certain embodiments, mechanical shearing may be employed through the use of a mechanical shearer to shear chemical solids from the ballast in the recycled ballasted solids portion prior to ballast recovery, for example, prior to magnetite recovery. For example, ballast material recovery system 75 may comprise a shear mill, a hydrocyclone and/or a rotating drum comprising a fixed array of rare-earth magnets. An example of a magnetic drum that may be utilized in embodiments of the presently disclosed ballast recovery system is disclosed in co-owned PCT application Publication No. WO 2014/088620, titled "MAGNETIC DRUM INLET SLIDE AND SCRAPER BLADE" which is incorporated herein by reference in its entirety for all purposes. Ballast material recovery system 75 may separate a recovered ballast material portion from a waste solids portion. The recovered ballast material portion can be returned to the ballast reactor tank 35 via conduit 48 and/or to source of ballast 65 via conduit 76.

Sensors S in the biological treatment unit(s) 20 and ballast reactor tank 35 may communicate, electrically or otherwise, with a controller 80 to provide the controller with signals corresponding to a property the contents of the biological treatment unit(s) 20 and ballast reactor tank 35. Controller 80 may control a quantity or rate of addition of flocculant, coagulant, adsorbant, pH adjuster, ballast, and/or metal precipitant to the ballast reactor tank 35 from respective sources of flocculant, coagulant, adsorbant, pH adjuster, ballast, and metal precipitant 45, 50, 55, 60, 65, and 70. The controller 80 may control a quantity or rate of addition of flocculant, coagulant, adsorbant, pH adjuster, ballast, and/or metal precipitant to the ballast reactor tank 35 based on signals received from one or more sensors S in the system, for example, one or more sensors in the ballast reactor tank 35 or upstream or downstream of the ballast reactor tank 35. Controller 80 may control the degree of opening of valves in the various conduits in the system. One or more of valves (not shown) may be connected to controller 80, however, to avoid complication, the connections are not shown in FIG. 1.

The controller 80 of the systems disclosed herein may be implemented using one or more computer systems. The computer system may be, for example, a general-purpose computer such as those based on an Intel® CORE™ type processor or Intel® Atom™ type processor, a Motorola PowerPC® processor, a Sun UltraSPARC® processor, a Hewlett-Packard PA-RISC® processor, or any other type of processor or combinations thereof. Alternatively, the computer system may include specially-programmed, special-purpose hardware, for example, an application-specific integrated circuit (ASIC) or controllers intended for analytical systems.

The computer system can include one or more processors typically connected to one or more memory devices, which can comprise, for example, any one or more of a disk drive memory, a flash memory device, a RAM memory device, or other device for storing data. The memory is typically used for storing programs and data during operation of the treatment system and/or computer system. Software, including programming code that implements embodiments of the disclosure, can be stored on a computer readable and/or writable nonvolatile recording medium, and then typically copied into memory wherein it can then be executed by the processor. Components of the computer system may be coupled by an interconnection mechanism, which may include one or more busses (e.g., between components that are integrated within a same device) and/or a network (e.g., between components that reside on separate discrete devices). The interconnection mechanism enables communications (e.g., data, instructions) to be exchanged between components of the computer system. The computer system can also include one or more input devices, for example, sensors such as any of sensors S, a keyboard, mouse, trackball, microphone, touch screen, and one or more output devices, for example, a printing device, display screen, or speaker. In addition, the computer system may contain one or more interfaces that can connect the computer system to a communication network (in addition or as an alternative to the network that may be formed by one or more of the components of the computer system).

According to one or more embodiments, the one or more input devices may include sensors for measuring parameters. The sensors, valves, and/or pumps of the wastewater treatment system 100, or all of these components may be connected to a communication network that is operatively coupled to the computer system.

Controller 80 can include one or more computer storage media such as readable and/or writeable nonvolatile recording medium in which signals can be stored that define a program to be executed by one or more processors. Storage medium may, for example, be a disk or flash memory. Although the computer system may be one type of computer system upon which various aspects may be practiced, it should be appreciated that aspects and embodiments are not limited to being implemented in software, or on a general purpose computer system. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects may be implemented in software, hardware or firmware, or any combination thereof. For example, one or more segments of an algorithm executable by the controller can be performed in separate computers, which in turn, can be communication through one or more networks.

Figure 2:
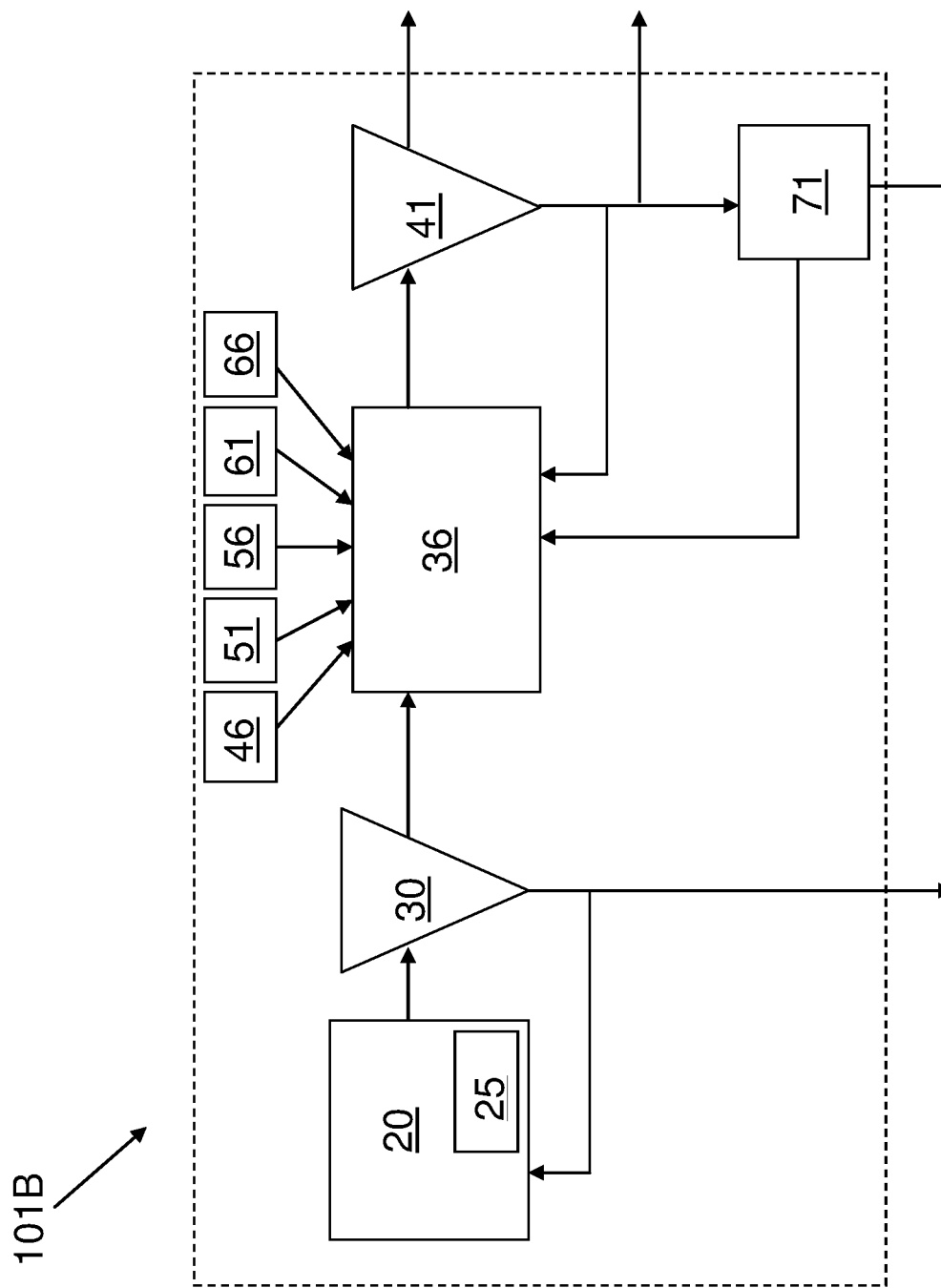
FIG. 2 presents a schematic of an alternative secondary treatment sub-system of the wastewater treatment system of FIG. 1.

In another embodiment of the secondary treatment sub-system, indicated generally at 101B in FIG. 2, a ballast reactor tank 36 may be disposed downstream of a solids-lean effluent outlet of clarifier 30. The ballast reactor tank 36 may receive ballast from a source of ballast 66 and/or recycled ballast from a ballast recovery system 71 to facilitate settling and removal of biological floc from the solids-lean effluent from clarifier 30. Sources of flocculant 46, coagulant 51, adsorbant 56, pH adjuster 61, and ballast 66 may be fluidly connected to ballast reactor tank 36 and may operate similarly to sources of flocculant 45, coagulant 50, adsorbant 55, pH adjuster 60, and ballast 65 fluidly connected to ballast reactor tank 35. A solids-liquid separator, for example, clarifier 41 may separate ballasted effluent from the ballast reactor tank 36 into a ballasted solids portion from which ballast may be recovered in ballast recovery system 71 and a solids lean partially treated wastewater to be sent for further processing in the tertiary treatment sub-system 100C. Ballast recovery system 71 may be substantially similar to the ballast recovery system 75 associated with the ballast reactor tank 35.

EXAMPLES

A treatability study was conducted with the effluent from a trickling filter of a municipal wastewater treatment plant. The objective of this study was to determine what additives could be used to achieve a total copper concentration of ≤14 ug/L in the treated supernatant. Four series of jar tests were conducted with the following added to the wastewater effluent.

1. Baseline: Aluminum chlorohydrate (ACH)/ferric chloride (ferric) coagulant with flocculent.
2. Baseline with pH Adjust: The targeted pH was 8, however, the target was not fully achieved due to the instability of the wastewater. In this series, there seems to be an outlier (Jar 9). This has been taken out when calculating averages.
3. Coagulant at 100 mg/L, pH Adjust, and $Na_2S$: Here again the pH was targeted to 8, but did not hold up well.
4. Coagulant at 100 mg/L, pH Adjust, $Na_2S$, and recycled solids. Simulated recycled solids were generated by adding ACH to wastewater effluent in separate jars.

TABLE 1

Wastewater Quality (TF Effluent)

| Parameter (units) | Concentration |
| --- | --- |
| TSS (mg/L) | 45.5 |
| Total Phosphorous (mg/L) | 6.63 |
| Soluble Phosphorous (mg/L) | 5.88 |
| Total Cu (μg/L) | 56.6 |
| Soluble Cu (μg/L), 0.45 micron filter | 15.5 |
| Tubidity (NTU) | 34.1 |
| pH (standard units) | 7.19 |

Series 1: This series was a baseline with a coagulant and a flocculent. Two coagulants (Ferric and ACH) were used. The flocculent used was a high molecular weight, high charge density, anionic.

TABLE 2

Baseline

| Parameter | Concentration/Removal Percentage | | | | | | |
| --- | --- | --- | --- | --- | --- | --- | --- |
| | Jar 1 | Jar 2 | Jar 3 | Jar 3R | Jar 4 | Jar 5 | Jar 6 |
| ACH (mg/L) | 25 | 65 | 100 | 100 | | | |
| Ferric (mg/L) | | | | | 25 | 65 | 100 |
| pH | 6.75 | 7.33 | 7.26 | 6.79 | 7.28 | 7.09 | 6.89 |
| Flocculant (mg/L | 1 | 1 | 1 | 1 | 1 | 1 | 1 |
| Turbidity (NTU) | 0.60 | 0.23 | 0.16 | | 2.80 | 1.69 | 0.69 |
| TSS (mg/L) | 1.75 | 1.0 | 1.0 | 2.5 | 3.1 | 0.95 | 2.0 |
| TSS % Removal | 96% | 98% | 98% | 95% | 93% | 98% | 96% |
| Total Phosphorous (mg/L) | 0.152 | 0.086 | 0.054 | 0.071 | 0.286 | 0.170 | 0.072 |
| Total Phosphorous % Removal | 98% | 99% | 99% | 99% | 96% | 97% | 99% |
| Soluble Phosphorous (mg/L) | 0.131 | 0.083 | 0.044 | 0.066 | 0.239 | 0.158 | 0.034 |
| Soluble Phosphorous % Removal | 98% | 99% | 99% | 99% | 96% | 97% | 99% |
| Total Cu (μg/L) | 13.7 | 14.8 | 12.5 | 15.1 | | 16.2 | |
| Total Cu % Removal | 76% | 74% | 78% | 73% | | 71% | |
| Soluble Cu (μg/L) | 14.4 | 11.1 | 11.2 | 8.2 | | 13.7 | |
| Soluble Cu % Removal | 7% | 28% | 28% | 47% | | 12% | |

Observation:

Total Cu removal with Ach addition averages 75% with very little variation with changing ACH dose. Soluble Cu removal averages 28%, however, it increases with the ACH dose. The greater concentration of hydroxide floc generated by the higher ACH dose may allow for greater adsorption of the soluble copper content.

Series 2: In this series the pH was adjusted to a target of 8 to mimic the minimum solubility conditions for Cu. However, the aforementioned pH condition was not fully met.

TABLE 3

Baseline with pH Adjust

| Parameter | Concentration/Removal Percentage | | | | | | |
|---|---|---|---|---|---|---|---|
| | Jar 7 | Jar 8 | Jar 9 | Jar 9R | Jar 10 | Jar 11 | Jar 12 |
| ACH (mg/L) | 25 | 65 | 100 | 100 | | | |
| Ferric (mg/L) | | | | | 25 | 65 | 100 |
| pH | 7.25 | 7.5 | 7.37 | 7.72 | 7.28 | 7.05 | 6.92 |
| Flocculant (mg/L) | 1 | 1 | 1 | 1 | 1 | 1 | 1 |
| Turbidity (NTU) | 0.79 | 0.39 | 0.19 | | 3.12 | 1.75 | 0.49 |
| TSS (mg/L) | 3.0 | 1.3 | 0.75 | 1.0 | 4.2 | 3.0 | 1.5 |
| TSS % Removal | 93% | 97% | 98% | 98% | 91% | 93% | 97% |
| Total Phosphorous (mg/L) | 0.375 | 0.168 | 0.088 | 0.166 | 0.48 | 0.213 | 0.08 |
| Total Phosphorous % Removal | 94% | 97% | 99% | 97% | 93% | 97% | 99% |
| Soluble Phosphorous (mg/L) | 0.332 | 0.156 | 0.080 | 0.163 | 0.388 | 0.177 | 0.047 |
| Soluble Phosphorous % Removal | 94% | 97% | 99% | 97% | 93% | 97% | 99% |
| Total Cu (µg/L) | 13.4 | 13.9 | 10.9 | 10.8 | | 19.2 | |
| Total Cu % Removal | 76% | 75% | 81% | 81% | | 66% | |
| Soluble Cu (µg/L) | 13.6 | 11.4 | 11.6 | 10.2 | | 13.2 | |
| Soluble Cu % Removal | 12% | 26% | 25% | 34% | | 15% | |

Observation:

Total Cu removal with ACH addition averages 78%. Similar to series 1, very little variation with changing ACH dose. The total Cu removal percentage is slightly higher than in series 1 (no pH adjust). However, it should be noted that the targeted pH condition was not fully achieved.

The soluble Cu removal percentage averages 25%, lower than the 28% achieved in series 1. Similar to series 1, it follows the dose response noted.

JAR 9R does get to a pH of 7.72 with an 81% total Cu and 34% soluble Cu removal, respectively. JAR 9 performs similarly with total Cu with a pH of 7.37.

Series 3: In this series a coagulant dose of 100 mg/L was used with the pH adjusted to a target of 8. Here again, the aforementioned pH condition was not fully met due to unstable conditions. $Na_2S$ chemistry was introduced in this series as a mechanism for Cu removal.

TABLE 4

Baseline, pH Adjust with $Na_2S$ Chemistry

| Parameter | Concentration/Removal Percentage | | | | | |
|---|---|---|---|---|---|---|
| | Jar 13 | Jar 14 | Jar 15 | Jar 16 | Jar 17 | Jar 18 |
| ACH (mg/L) | 100 | 100 | 100 | | | |
| Ferric (mg/L) | | | | 100 | 100 | 100 |
| pH | 7.50 | 7.54 | 7.56 | 7.05 | 6.90 | 7.00 |
| $Na_2S$ (mg/L) | 10 | 25 | 50 | 10 | 25 | 50 |
| Flocculant (mg/L) | 1 | 1 | 1 | 1 | 1 | 1 |
| Turbidity (NTU) | 0.29 | 0.19 | 0.18 | 1.25 | 4.85 | 13.05 |
| TSS (mg/L) | 0.95 | 0.88 | 1.04 | 3.71 | 4.0 | 3.75 |
| TSS % Removal | 98% | 98% | 98% | 92% | 91% | 92% |
| Total Phosphorous (mg/L) | 0.226 | 0.190 | 0.174 | 0.14 | 0.136 | 0.13 |
| Total Phosphorous % Removal | 97% | 97% | 97% | 98% | 98% | 98% |
| Soluble Phosphorous (mg/L) | 0.221 | 0.189 | 0.168 | 0.069 | 0.110 | 0.070 |
| Soluble Phosphorous % Removal | 96% | 97% | 97% | 99% | 98% | 99% |
| Total Cu (µg/L) | 15.4 | 12.8 | 14.8 | 18.1 | | |
| Total Cu % Removal | 73% | 77% | 74% | 68% | | |
| Soluble Cu (µg/L) | 9.6 | 10.4 | 8.1 | 9.8 | | |
| Soluble Cu % Removal | 38% | 33% | 48% | 37% | | |

Observation:

Total Cu removal with ACH addition averages 75%. There is very little variation in total Cu removal with varying $Na_2S$ dose.

The soluble Cu removal percentage averages 40%, higher than that achieved in series 1 and 2.

Series 4: In this series additional amounts of solids were used to mimic the recycle of hydroxide floc to a solids removal reactor. Simulated recycled solids were generated by adding ACH to wastewater effluent in separate jars. In this series an ACH dose of 100 mg/L was used. pH was adjusted to approach 8 in JAR 22 and 23 only. $Na_2S$ was introduced.

TABLE 5

Baseline, pH Adjust with Na2S Chemistry and High Solids

| Parameter | Concentration/Removal Percentage | | |
|---|---|---|---|
| | Jar 21 | Jar 22 | Jar 23 |
| ACH (mg/L) | 100 | 100 | 100 |
| pH | 7.12* | 7.93 | 8.65 |
| Na$_2$S (mg/L) | 25 | 25 | 50 |
| Flocculant (mg/L) | 1 | 1 | 1 |
| TSS (mg/L) | 4.00 | 0.67 | 2.25 |
| TSS % Removal | 91% | 99% | 95% |
| Total Phosphorous (mg/L) | 0.064 | 0.104 | 0.384 |
| Total Phosphorous % Removal | 99% | 98% | 94% |
| Soluble Phosphorous (mg/L) | 0.026 | 0.101 | 0.368 |
| Soluble Phosphorous % Removal | 100% | 98% | 94% |
| Total Cu (µg/L) | 9.0 | 9.5 | 9.2 |
| Total Cu % Removal | 84% | 83% | 84% |
| Soluble Cu (µg/L) | <5 | 7.4 | 5.2 |
| Soluble Cu % Removal | >68% | 52% | 66% |

*pH was not adjusted

Observation:

Total Cu removal with ACH addition averages 84%, higher compared to previous series. The soluble Cu removal percentage averages >62%, much higher than previous series.

CONCLUSIONS

Data is averaged for each series below.

TABLE 6

Results Summary

| Series | Total Cu Concentration | % Removal | Soluble Cu Concentration | % Removal |
|---|---|---|---|---|
| Baseline | 14.0 | 75% | 11.2 | 28% |
| Baseline + pH Adjust | 12.3 | 78% | 11.7 | 25% |
| Baseline + pH Adjust + Na$_2$S | 14.3 | 75% | 9.4 | 40% |
| Baseline + pH Adjust + Na$_2$S + Solids Recycle | 9.2 | 84% | <5.9 | >62% |

Recycled solids content is driving the total and soluble Cu removal efficiencies more than $Na_2S$ chemistry or pH adjustment. This phenomenon is clear in both total and soluble Cu removal. All three jars to which recycled solids were added exhibited <10 µg/L for total Cu and <8 µg/L for soluble Cu (series 4).

The average soluble Cu concentration for all ACH addition tests when no recycled solids are introduced is 10.9 µg/L (30% removal) vs. <5.9 µg/L (>62% removal) when recycled solids are introduced.

The average total Cu concentration for all ACH addition tests when no recycled solids are introduced is 13.5 µg/L (76% removal) vs. 9.2 µg/L (84% removal) when recycled solids are introduced. Total Cu removal percentage improvement with addition of recycled solids was not as pronounced as soluble Cu removal percentage.

The methods and systems described herein are not limited in their application to the details of construction and the arrangement of components set forth in the previous description or illustrations in the figures. The methods and systems described herein are capable of other embodiments and of being practices or of being carried out in various ways. Also, the phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, as well as alternate embodiments consisting of the items listed thereafter exclusively.

Use of ordinal terms such as "first," "second," "third," and the like in the specification and claims to modify an element does not by itself connote any priority, precedence, or order of one element over another or the temporal order in which acts of a method are performed, but are used merely as labels to distinguish one element having a certain name from another element having a same name, but for use of the ordinal term, to distinguish the elements.

Those skilled in the art would readily appreciate that the various parameters and configurations described herein are meant to be exemplary and that actual parameters and configurations will depend upon the specific application for which the apparatus and methods of the present disclosure are used. Those skilled in the art will recognize, or be able to ascertain using no more than routine experimentation, many equivalents to the specific embodiments described herein. For example, those skilled in the art may recognize that the system, and components thereof, according to the present disclosure may further comprise a network of systems or be a component of a water treatment system. It is, therefore, to be understood that the foregoing embodiments are presented by way of example only and that, within the scope of the appended claims and equivalents thereto, the disclosed systems and methods may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order disclosed or in alternate orders and the methods may include additional or alternative acts or may be performed with one or more of the disclosed acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Accordingly, the foregoing description and figures are by way of example only. Further, the depictions in the figures do not limit the disclosures to the particularly illustrated representations.

While exemplary embodiments of the disclosure have been disclosed, many modifications, additions, and deletions may be made therein without departing from the spirit and scope of the disclosure and its equivalents, as set forth in the following claims.

What is claimed is:

1. A system for treating wastewater, the system comprising:
   a primary treatment sub-system;
   a secondary treatment sub-system in fluid communication downstream of the primary treatment sub-system, the secondary treatment sub-system including one or more biological treatment units and a first solids-liquids separator positioned downstream of the one or more biological treatment units configured to recycle settled activated sludge back to the one or more biological treatment units, the secondary treatment sub-system configured to remove biological contaminants from the wastewater and produce a partially treated wastewater including a dissolved metal; and
   a tertiary treatment sub-system in fluid communication downstream of the secondary treatment sub-system, the tertiary treatment sub-system comprising:
      a reactor tank configured and arranged to receive the partially treated wastewater from the secondary treatment sub-system, the reactor tank including at least one inlet and an outlet;
      a source of a ballast material fluidly connected to the reactor tank;
      a source of coagulant fluidly connected to the reactor tank;
      a second solids-liquid separator having an inlet fluidly connected to the outlet of the reactor tank and including a solids-lean effluent outlet and a ballasted solids outlet, the second solids-liquid separator configured to separate ballasted effluent from the outlet of the reactor tank into a solids-lean effluent and ballasted solids, to discharge the solids-lean effluent from the solids-lean effluent outlet, and to discharge the ballasted solids from the ballasted solids outlet;
      a ballast recovery system in fluid communication with the ballasted solids outlet of the second solids-liquid separator configured to separate ballast from the ballasted solids and return the separated ballast to the source of ballast material through a conduit fluidly connecting the ballast recovery system to the source of ballast material;
      a recycle conduit having an inlet fluidly connected to the ballasted solids outlet and an outlet fluidly connected to the reactor tank; and
      a controller configured to recycle a portion of the ballasted solids from the ballasted solids outlet of the second solids-liquid separator to the reactor tank through the recycle conduit in an amount sufficient to generate an amount of metal hydroxide floc in the reactor tank sufficient to reduce a concentration of dissolved metal in the reactor tank.

2. The system of claim 1, wherein the controller is configured to recycle the portion of the ballasted solids from the ballasted solids outlet of the second solids-liquid separator to the reactor tank through the recycle conduit in an amount sufficient to generate an amount of metal hydroxide floc in the reactor tank sufficient to reduce a concentration of dissolved metal in the reactor tank to below 10 micrograms/liter.

3. The system of claim 2, wherein the controller is configured to recycle the portion of the ballasted solids from the ballasted solids outlet of the second solids-generate liquid separator to the reactor tank through the recycle conduit in an amount sufficient to an amount of metal hydroxide floc in the reactor tank sufficient to reduce a concentration of dissolved metal in the reactor tank to below 5 micrograms/liter.

4. The system of claim 2, wherein the controller is configured to recycle between 5% to 25% of ballasted solids separated from the ballasted effluent in the second solids-liquid separator to the reactor tank.

5. The system of claim 4, wherein the controller is configured to recycle 10% of ballasted solids separated from the ballasted effluent in the second solids-liquid separator to the reactor tank.

6. The system of claim 1, further comprising a source of a metal precipitant in fluid communication with the reactor tank.

7. The system of claim 6, wherein the metal precipitant is a sulfide-containing compound.

8. The system of claim 1, further comprising a source of a pH adjustment agent in fluid communication with the reactor tank.

9. The system of claim 8, wherein the controller is further configured to control a quantity of pH adjustment agent introduced into the reactor tank to achieve a pH in the reactor tank at which a compound including the dissolved metal is substantially insoluble.

10. The system of claim 1, further comprising a source of a flocculant in fluid communication with the reactor tank.

11. The system of claim 10, further comprising a source of an adsorbent in fluid communication with the reactor tank.

12. The system of claim 11, further comprising a source of a pH adjustment agent in fluid communication with the reactor tank.

13. The system of claim 1, further comprising a source of an adsorbent in fluid communication with the reactor tank.

14. The system of claim 1, is further configured to return the separated ballast to the reactor tank.

15. The system of claim 1, wherein the secondary treatment sub-system further comprises:
   a second reactor tank configured and arranged to remove biological contaminants from the wastewater; and
   a ballast recycle system configured to return a portion of ballasted solids output from the second reactor tank to the second reactor tank.

* * * * *